3,535,211
METHOD FOR THE PRODUCTION OF EMBOSSING SURFACES
Stanley Charles Frowde, Hyde, England, assignor to Imperial Chemical Industries Limited, London, England, a corporation of Great Britain
No Drawing. Filed Nov. 30, 1967, Ser. No. 686,822
Claims priority, application Great Britain, Dec. 6, 1966, 54,489/66
Int. Cl. B51c 3/08; C23b 5/60
U.S. Cl. 204—6      8 Claims

ABSTRACT OF THE DISCLOSURE

A process is provided for producing a pattern embossing surface by electroplating an electrode surface which is a negative of the embossing surface, and wherein depressions in the electrode surface have depths greater than their widths. Suitably a conductive organic polymer is used to prepare the electrode for electroplating and the electrode is in the form of a thin sheet having a conductive backing thereon. The thicknesses of the conductive organic polymer between the conductive backing and the bottoms of the depressions are such that the metal electrodeposited on the electrode is preferentially deposited at the bottom of the depressions, at least at the beginning of the electrodeposition process.

---

This invention concerns an improved method for the production of metal embossing surfaces by electrolytic deposition of the metal on to the surface of an electrode having the required surface configuration and made from an organic polymeric material.

Attempts have been made to produce embossing surfaces by forming an impression of a master surface in a suitable impression-receiving and retaining material, for example polyvinyl chloride or a silicone elastomer, the impression which serves as an electrode, then being coated electrolytically with one of the metals used in the art. When a metal layer of the desired thickness has been formed it is removed from the electrode. The surface of the metal layer, the embossing surface has a configuration which is a reproduction of the master surface.

Before the impression can be electroplated it is necessary to render it electrically conductive in order that it can serve as an electrode.

Usually this has been achieved by applying a coating of a conductive medium, for example graphite or silver, on to the patterned surface of the impression.

Alternatively the material used to form the impression has itself been rendered conductive by incorporating an electrically conductive filler, e.g. graphite, in the impression material.

With most embossing patterns required in the art it has been possible to produce, by these techniques an embossing surface which closely resembles the master surface used. However when the master surface has a surface pattern which includes a plurality of closely spaced projections having a height which is greater than the distance between adjacent projections when the reproduction has not been good. In particular when it is required to produce an embossing surface having a surface pattern comprising a multiplicity of projections having a height in excess of 0.002 inch and more than 400 projections per square inch, i.e. an embossing surface for use in the production of a suede like material, then the results are unsatisfactory.

Necessarily, in this case, the surface of the electrode used is the negative of that required on the embossing surface, that is the electrode has a surface pattern comprising a multiplicity of surface depressions having a depth in excess of 0.002 inch, the width of a depression at its open end being much less than its depth.

It is apparent that the reason for the poor reproduction arises during the electroplating stage as the metal is preferentially deposited in the shallower portions of the depressions in the electrode surface rather than the deeper portions. This results in the deeper portions of the depressions in the electrode surface being incompletely filled with metal.

The method of the present invention alleviates this difficulty in that during electrodeposition the metal is preferentially deposited in the deeper portions of the depressions in the electrode surface until they are filled, after which the deposition proceeds smoothly.

In accordance with the present invention a method of producing a patterned embossing surface by electroplating an electrode which is a negative of the surface, the electrode surface pattern effectively comprising a plurality of depressions, at least some of which have depths greater than their widths, includes the stage of electrodepositing a layer of the metal on to the surface of a thin sheet-like electrode made of conductive organic polymeric material and provided with an electrically conductive backing, the thickness of the conductive organic polymeric material between the conductive backing and the bottom of the depressions in relation to the depths of the depressions, and consequently the relative conductivities of the electrical paths between the backing and the bottom and tops of the depressions, being such that initially metal is preferentially deposited in the bottom of the depressions.

The electrode we use is thin in the sense that the depressions are of a depth which is a substantial proportion of the thickness of the electrode and consequently the conductivity of the electrical path from the bottom of the depressions to the backing is significantly greater than that of the path through the full thickness of the electrode. Preferably the thickness of the conductive organic polymeric material between the conductive backing and the bottom of the deepest depression is not more than three times the depth of this deepest depression.

Suitable organic polymeric materials from which the electrode may be made are vinyl polymers, e.g. polyvinyl chloride, polyvinyl acetate; acrylics e.g. polymethyl methacrylate; high impact acrylics; cellulosics; polyesters; polyamides e.g. nylon 6/6, nylon 6/10, and various copolymers or mixtures of the above. Also suitable are synthetic elastomers, for example, chloroprene, butadiene-styrene copolymer, butadiene-acrylonitrile copolymer, polysulphide rubbers and silicone rubbers. Also natural rubbers are suitable.

The physical properties, for example flexibility and electrical conductivity of the electrode may be varied by altering the proportions of the ingredients used in its construction. The required conductive properties may be obtained by the use of conducting fillers such as carbon blacks or metal powders. The overall conductivity of the electrode will normally be adjusted to that most suitable for the particular electrolysis conditions under which it will be used.

The electrically conductive backing provided in the electrode may be an imperforate or a perforated sheet of metal, the term perforated being used to indicate holes or perforations in any form. Thus, the conductive backing may be a metallic wire mesh or an expanded metal, or alternatively a continuous or perforated metal sheet. When the backing is a wire mesh or a perforated metal sheet it is essential that the size of the mesh or holes should not disturb the electrical resistance differential which exists between the backing and the deeper portions of the depressions and the backing and the raised portions respectively. The conductive backing may extend beyond one edge of the polymeric electrode so that it may be connected in the electrical circuit.

Though the embossing surface may be produced in any suitable metallic material, examples of materials which are particularly suited to the method of the present invention are nickel and copper.

The invention is further illustrated by the following example in which all parts are by weight.

EXAMPLE

The following ingredients were compounded together—

| | Parts |
|---|---|
| Vinyl chloride homopolymer | 80 |
| Vinyl chloride/vinyl acetate copolymer | 20 |
| Di-"Alphanol" phthalate | 100 |
| Acetylene carbon black | 60 |

"Alphanol" being a registered trade mark of Imperial Chemical Industries Limited.

The compound mixture was formed into a polymeric sheet 1 having a thickness of 0.040 inch by passing it between two rotary rollers maintained at 100 and 110° C. respectively.

The resistivity of the polymeric sheet as it was taken from the rollers was $1.25 \times 10^8$ ohm inch.

A piece of the sheet was placed on top of an appropriately sized piece of wire mesh having a mesh size of 60 x 60 wires per inch, the wires being 37 imperial Standard wire gauge, and together they were placed with the polymeric sheet uppermost, between the platens of a press. Between the upper platen and the polymeric sheet was inserted a pad of silicone elastomer having on one surface, the master surface, a surface configuration which comprised a multiplicity of conical projections, there being approximately 12,500 projections per square inch, the height of each projection being approximately 0.011 inch and the distance between adjacent projections being approximately 0.004 inch.

This upper platen was heated to about 165° C. before being brought into contact with the silicone elastomer pad. A pressure of 300 pounds per square inch was maintained between the platens for about 5 minutes, after which the upper platen was cooled before the pressure was released.

After cooling the piece of polymeric sheet which was now moulded to the required shape, was removed from the silicone elastomer pad without damage. The piece was now provided on one surface with a surface pattern which was the reverse of that provided on the elastomer pad.

Also its other surface was laminated to the piece of wire mesh. The overall thickness of the moulded conductive organic polymeric sheet together with the wire mesh was 0.052 inch, the surface depressions being 0.011 inch deep.

The surfaces of the electrode so formed which were not required to be conductive were coated with a non-conductive lacquer.

A measurement of the resistivity of the polymeric compound after being subjected to the conditions of the moulding cycle revealed that it had fallen to $4 \times 10^4$ ohm inch.

Calculations revealed that the resistance of one square inch of the electrode between the wire mesh and the deeper portions of the depressions in the electrode surface (a distance of approximately 0.028 inch) was about one third of the resistance of one square inch of the electrode between the wire mesh and the raised portions between the depressions in the electrode surface (a distance of approximately 0.040 inch).

To perform the electrodeposition, an electrode made as above was used as a cathode, the anode being pure nickel, in a suitable electroplating bath and an electric current was passed between the anode and the cathode.

The electroplating bath was an aqueous solution containing the following dissolved chemicals at the concentrations given:

| | Oz./gallon |
|---|---|
| Hydrated nickel sulphate | 45 |
| Hydrated nickel chloride | 9 |
| Boric acid | 5 |
| Naphthalene trisulphonic acid sodium salt | 0.5 |

The plating bath was used at a temperature of 45° C. The current density used was 10 amperes per square foot of cathode area and the electrodeposition was continued for 70 hours, by which time the weight of nickel deposited per square foot of cathode area was approximately 25 oz. By the end of the electrodeposition the nickel reproduction was easily removed from the cathode by peeling the latter from it.

It will be understood that the master surface, which in the example provided was the surface of a silicone elastomer pad, will have a surface pattern corresponding to the finished embossing surface whereas the electrode will have a surface pattern corresponding to the original material.

It will thus be apparent that when one wishes eventually to produce an embossed material, for example an embossed thermoplastic sheet, having an embossed pattern corresponding to a sample, what might be termed original material, it is necessary to copy this and form what in the specification we have referred to as a master surface, before one is in a position to produce the electrode. Conveniently when the original material is a sheet of thermoplastic material, for example polyvinyl chloride, we produce a master surface by casting an organopolysiloxane gum composition onto its pattern surface and allowing the composition to cure to an elastomer before removing it from the original material. The silicone elastomer is provided with a surface pattern which is the reverse of that provided on the original material, and this we call the master pattern. The electrode is then produced, as described in the example and elsewhere, by taking an impression of the master surface with a suitable impression-receiving and retaining material, for example a polyvinyl chloride composition.

What I claim is:

1. In a method for producing a patterned embossing surface by electroplating an electrode surface which is a negative of the embossing surface, and wherein the electrode surface contains at least some depressions which have depths greater than the widths of the depression openings, the improvement comprising providing a thin-sheet like electrode made of conductive organic polymeric material which has an electrically conductive backing and wherein the depressions in the electrode are of a depth which is a substantial proportion of the thickness of the electrode and wherein the thicknesses of the conductive polymeric material between the said conductive backing and the bottom of the said depressions are small compared to the full thickness of the electrode, whereby the electrical conductivity of the electrical paths from the bottoms of the said depressions to the backing is significantly greater than that of the electrical path though the full thickness of the electrode, electrodepositing metal on the surface of the electrode and wherein metal is initially preferentially deposited in the bottoms of the said depressions.

2. A method as claimed in claim 1 in which the said thickness of the conductive organic polymeric material between the conductive backing and the bottoms of the depressions is not more than three times the depth of the depressions.

3. A method as claimed in claim 2 in which the electrically conductive backing is a sheet of metal.

4. A method as claimed in claim 3 in which the sheet of metal is perforated.

5. A method as claimed in claim 1 in which the organic polymeric material is rendered conductive by the incorporation of a conductor selected from carbon black and a metal powder in the polymeric material.

6. A method as claimed in claim 1 in which the metal deposited on the surface of the electrode is selected from nickel and copper.

7. A method as claimed in claim 1 for producing a metal embossing surface having a surface pattern comprising more than 400 surface depressions per square inch, the depressions having a depth in excess of 0.002 inch.

8. A method as claimed in claim 7 for producing a metal embossing surface having a surface pattern comprising approximately 12,500 conical shaped depressions, the depth of each depression being approximately 0.011 inch and the diameter at the open end of each depression being approximately 0.004 inch.

References Cited

UNITED STATES PATENTS

| 2,578,209 | 12/1951 | Schwarz | 204—6 |
| 2,632,722 | 3/1953 | Libberton | 204—6 |

FOREIGN PATENTS

| 653,367 | 5/1951 | Great Britain. |

JOHN H. MACK, Primary Examiner

T. TUFARIELLO, Assistant Examiner

U.S. Cl. X.R.

204—22